Patented Jan. 8, 1946

2,392,610

UNITED STATES PATENT OFFICE 2,392,610

DIESEL FUELS

Thomas T. Noland and Edwin M. Nygaard, Woodbury, N. J., assignors to Socony-Vacuum Oil Company, Incorporated, a corporation of New York No Drawing. Application April 20, 1943, Serial No. 483,784

16 Claims. (Cl. 44—57)

This invention has to do with fuels for internal combustion engines of the Diesel or compression ignition type, and, more particularly, has to do with the improvement of such fuels by the addition thereto of a characterizing ingredient.

In order that a Diesel engine may be operated at maximum efficiency, ignition of the fuel should be essentially instantaneous. Delayed ignition or poor coordination between the combustion and cylinder conditions is the cause of "knocking" in Diesel engine operation. As is well known to those familiar with the art, this condition may be remedied by adding small amounts of certain materials or compounds to Diesel or compression ignition fuels. Compounds possessed of such characterizing ability accelerate the ignition of the fuel and, thus, provide a means whereby the ignition delay period of the fuel is rendered extremely short. In this way, the better grades of Diesel fuels are enhanced and low-grade hydrocarbon mixtures are so improved in ignition quality that they may be used as fuels.

This invention is predicated upon the discovery that certain novel halogen- and nitrogen-containing reaction products are extremely effective in improving the ignition quality of Diesel fuel, and it contemplates Diesel fuel containing a minor proportion of such reaction products for the aforesaid improvement. The present invention also contemplates the development of a method for accelerating the spontaneous ignition of a liquid hydrocarbon fuel in compression ignition engines, this method being characterized by the admixture of such reaction products with the fuel prior to its ignition.

More specifically, this invention is broadly directed to the improvement of the ignition quality of Diesel fuel by the incorporation therein of minor proportions of halogen- and nitrogen-containing reaction products obtained by the reaction of nitrous acid and halogen-substituted nitroparaffins having a halogen atom, and a nitro group attached to the same carbon atom. The halogen-substituted nitroparaffins which represent one reactant in the aforesaid reaction are represented by the general formula

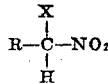

wherein X is a halogen atom (chlorine, bromine, iodine or fluorine) and R is a hydrogen atom or a hydrocarbon radical such as an alkyl, aralkyl, aryl or alkaryl radical. Typical reactants of the group or class represented by the foregoing general formula are chloronitromethane, 1-chloro-1-nitroethane, 1-chloro-1-nitropropane, 1-chloro-1-nitrobutane, phenylchloronitromethane, etc., and the corresponding bromo compounds such as 1-bromo-1-nitroethane, etc. Preferred of these reactants are those in which halogen is chlorine and the hydrocarbon radical is methyl, ethyl or propyl, this preference being influenced in part by the availability and cost of said reactants.

It will be apparent that the halogen-substituted nitroparaffin reactant will be characterized by attachment of at least one hydrogen atom to a carbon atom to which are also attached at least one halogen atom and at least one nitro group. In some cases, however, the halogen-substituted nitroparaffin reactant may have two halogen atoms and one nitro group attached to the same carbon atom, or may have two nitro groups and one halogen group attached to a common carbon atom; such nitroparaffins are substitution products of methane. Illustrative examples of such reactants are dichloromononitromethane and monochlorodinitromethane. It will be apparent that the aforesaid nitroparaffin reactant may be characterized by the presence of more than one

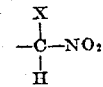

group in the molecule, the hydrocarbon group (R) attached to the carbon atom of said halogen- and nitro-containing group containing another such

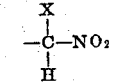

group. While all of these various halogen-substituted nitroparaffins are contemplated herein as reactants to be treated with nitrous acid, it is to be understood that those reactants which contain only one

characterizing group and in which the R group attached to the carbon atom of said characterizing group is hydrogen or a hydrocarbon group, are particularly preferred.

The Diesel fuel improving agents of the invention are designated herein as halogen- and nitrogen-containing reaction products rather than as definite chemical compounds. This designation is, perhaps, more accurate in view of the complex nature of the aforesaid halogen-substituted nitroparaffin reactant and, therefore, the complex nature of the reaction mechanism. Nevertheless, it will be apparent from the following discussion and illustrated procedures that our reaction products most probably contain a preponderance of certain well-defined chemical compounds, namely, halogen-substituted nitrolic acids and halogen-substituted pseudonitroles. For example, in Berichte, 10, 2085 (1877) a preparation of 1-bromo-butyl-pseudonitrole,

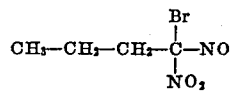

from nitrous acid and 1-bromo-1-nitrobutane is given. Accordingly, definite compounds of the foregoing type are contemplated as coming within the scope of this invention.

It is believed that the reaction mechanism most probably involved in the reaction of nitrous acid and the aforesaid halogen-substituted nitroparaffins is analagous to that which is involved in the reaction of said acid and unsubstituted nitroparaffins. That is, nitrous acid and an unsubstituted nitroparaffin are known to react in the manner illustrated by Equation I:

(I)
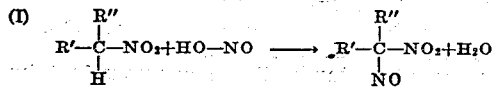

wherein R' and R'' are hydrocarbon radicals Therefore, assuming the halogen-substituted nitroparaffins would react similarly with nitrous acid, the reaction would be that illustrated by Equation II:

(II)
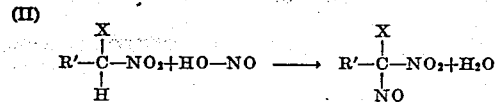

wherein R' is a hydrocarbon radical and X is a halogen atom; and the product would be a halogen-substituted pseudonitrole in which a hydrocarbon radical has been replaced by a halogen atom. Thus, it will be seen that the reaction product most probably contains a preponderance of a compound represented by the formula

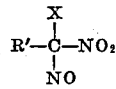

and it will be noted that said compound is characterized by attachment of a halogen atom, a nitro group and a nitroso group to a common carbon atom.

In the event that R' is hydrogen in the compounds illustrated in the foregoing reactions (I and II), the reaction products will be somewhat modified. For example, it is well known that when mononitromethane reacts with nitrous acid, the reaction proceeds as illustrated by Equation III:

(III)
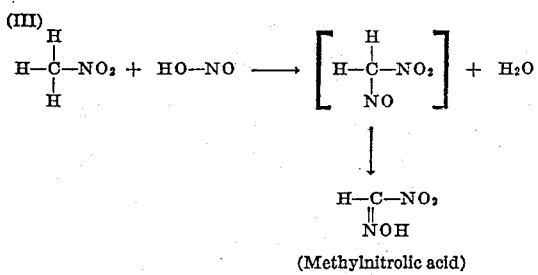

(Methylnitrolic acid)

Similarly, following the assumption made hereinabove, the reaction between nitrous acid and monohalonitromethane would be that represented by Equation IV:

(IV)
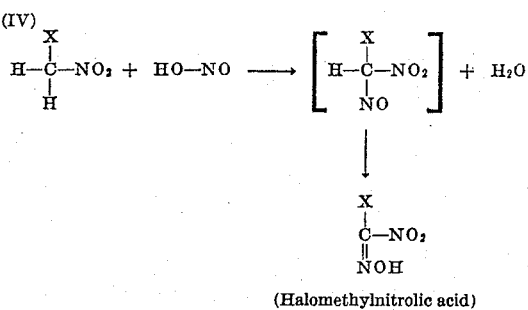

(Halomethylnitrolic acid)

Several procedures may be used to prepare the reaction products contemplated by this invention. One such procedure consists of dissolving an alkali nitrite in a cold solution of an alkali metal salt of a halogen-substituted nitroparaffin (formed from said nitroparaffin and alkali metal hydroxide) and treating the solution thus formed immediately with cold, dilute acid at a temperature of about 5° C. This procedure is preferably carried out with sodium nitrite, a dilute mineral acid, such for example as, hydrochloric, sulfuric, etc., and a temperature between about 0° C. and 5° C. Also contemplated herein as a desirable procedure is one in which alkali nitrite is omitted as a starting material. In this latter procedure, the equivalent of alkali nitrite is developed during the reaction, the reactants used in said procedure being a halogen-substituted nitroparaffin, aqueous alkali and mineral acid (other than nitrous acid). The temperature involved in the latter procedure is maintained below about 5° C. during the addition of mineral acid to a mixture of the halogen-substituted nitroparaffin and aqueous alkali.

It would appear, then, that the over-all reaction most probably involved in the foregoing procedures is that of said halogenated nitroparaffin with nitrous acid in the manner indicated above by Equations II and IV. However, this reaction most probably proceeds by means of the alkali metal salt of said nitroparaffin, typical of which is the sodium salt

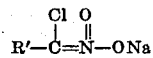

wherein R' is as defined above. While the over-all reaction presumably is as described above, only very small yields of the desired reaction products result when a halogenated nitroparaffin per se is treated with an alkali nitrite and mineral acid at low temperature; it is this that points to the desirability for an alkali metal salt of the foregoing type in the preparation of the desired reaction products.

Although the reactions involved are satisfactorily represented by Equations II and IV, they are not to be construed as the exact mechanism by which the desired products are formed.

As indicated above, the reaction products contemplated herein as Diesel fuel improving agents are prepared by procedures which involve the use of a relatively low temperature. In all of such procedures the reaction temperature should be maintained below about 15° C., and preferably within the range of 0° C. to 5° C. With regard to the proportions of reactants, a stoichiometrical amount, or a slight excess, of nitrous acid may be used with the halogenated nitroparaffins; and an excess of alkali metal hydroxide is preferred for the formation of the alkali metal salt of said paraffins. It has also been found that a rapid addition of mineral acid tends to keep various side reactions at a minimum, and thereby provides substantial yields of the desired reaction products.

The following examples are illustrative of the procedures by which the halogen- and nitrogen-containing reaction products of this invention may be obtained.

EXAMPLE 1

REACTION PRODUCT OF 1-CHLORO-1-NITROETHANE AND NITROUS ACID

Two hundred (200) grams of a 10% solution of sodium hydroxide were placed in a reaction flask equipped with stirrer, thermometer and dropping funnel, and surrounded by an ice bath. A quantity, 55 grams or 0.5 mol, of 1-chloro-1-nitroethane was added slowly to the alkali solution, the temperature during this addition being kept below about 5° C. After all of said chloro-nitroethane had dissolved in the alkali solution, 30 grams of sodium nitrite were added and dissolved in the cold solution. Then, 90 grams of 38% hydrochloric acid, diluted with an equal volume of cold water, were added dropwise to the reaction mixture. The acid was added over a period of about 30 minutes, care being taken to prevent a rise in temperature. After all of the acid had been added, a heavy, blue-green oil separated from the reaction mixture. This oil was washed with cold water, then filtered and dried over calcium chloride. The weight of this chlorine- and nitrogen-containing reaction product was 42 grams.

Assuming that the reaction mechanism suggested hereinabove is operative in this reaction, this chlorine- and nitrogen-containing reaction product is probably predominantly comprised of 1-chloro-1-nitroso-1-nitroethane, that is, 1-chloro-ethyl-pseudonitrole.

EXAMPLE 2

REACTION PRODUCT OF 1-CHLORO-1-NITROPROPANE WITH NITROUS ACID

Twenty-seven grams (0.22 mol) of 1-chloro-1-nitropropane were added slowly to a solution of 20 grams of potassium hydroxide dissolved in 150 mls. of water and cooled to 0° C. When the chloronitropropane had dissolved, 21 grams of sodium nitrite were added and the resulting solution transferred to a reaction flask surrounded by an ice bath, and equipped with stirrer, thermometer and dropping funnel. A slight excess of cold, dilute sulfuric acid was added dropwise over a period of about 2 hours, during which the temperature was kept below 10° C. As the acid was added, the reaction mixture turned green in color and a dark green oil separated therefrom. After all of the acid had been added, the dark green oil was separated from the reaction mixture, washed several times with water and filtered. This chlorine- and nitrogen-containing reaction product weighed 19 grams. It is probable that this reaction product is predominantly comprised of 1-chloro-1-nitroso-1-nitropropane, or 1-chloro-1-propyl-pseudonitrole.

The effectiveness of the reaction products contemplated herein in improving the ignition quality of a Diesel fuel is demonstrated by comparative test results of a fuel blank and fuel blends containing small amounts of said reaction products. That these reaction products are not only effective in this regard, but also very much more effective than the corresponding halogen-substituted nitroparaffins from which they were prepared, is also shown by comparative test results obtained on the same fuel blank and fuel blends containing said nitroparaffins. The fuel blank used in these tests is a typical Diesel fuel, a base stock known in the trade as a number two fuel oil having the following characteristics:

| | |
|---|---|
| Specific gravity | 0.8833 |
| A. P. I. gravity | 28.7 |
| Color (Lovibond) | 9 |
| Sulfur | Per cent__ 0.2 |
| Pour point | °F__ 5 |
| Flash point | °F__ 220 |
| Aniline No. | °F__ 125 |
| A. S. T. M. distillation °F.: | |
| Initial | 431 |
| 10% | 481 |
| 90% | 589 |
| End point | 633 |
| Diesel index | 35.9 |
| Cetane number | 33.0 |

The ignition quality of the base stock and of the fuel blend was determined by comparison with a standard reference fuel in a converted C. F. R. engine, using the ignition delay method. The value obtained in this test is expressed as the "cetane number," which is the per cent by volume of cetane in a blend of cetane and alpha methyl naphthalene having the same combustion characteristics as the sample under test (see Proc. Amer. Soc. Testing Materials, volume 36, I, 418 (1936)).

The results obtained in the foregoing tests with fuel blends containing various amounts of typical reaction products of the type contemplated herein, and of the corresponding halogen-substituted nitroparaffins from which said reaction products were prepared, are shown in the table below:

*Table*

| Substance blended with base fuel | Conc. weight per cent | Cetane No. of blend | Increase in cetane No. |
|---|---|---|---|
| *Halogen-substituted nitroparaffins:* | | | |
| 1-chloro-1-nitroethane | 1.0 | 36.2 | 3.2 |
| 1-chloro-1-nitropropane | 1.0 | 37.8 | 4.8 |
| 1-chloro-1-nitropropane | 0.5 | 37.3 | 4.3 |
| *Reaction product of nitrous acid and:* | | | |
| 1-chloro-1-nitroethane (predominantly 1-chloro-1-ethylpseudonitrole) | 1.0 | 41.6 | 8.6 |
| 1-chloro-1-nitropropane (predominantly 1-chloro-1-propylpseudonitrole) | 1.0 | 43.5 | 10.5 |
| 1-chloro-1-nitropropane (predominantly 1-chloro-1-propylpseudonitrole) | 0.5 | 39.8 | 6.8 |

The foregoing results indicate that typical reaction products contemplated herein increase the cetane number of the fuel described above from 6.8 to 10.5 units, when used in amounts ranging from 0.5 to 1.0 per cent. These results also indicate that the corresponding halogen-substituted nitroparaffins above (that is, not reacted with nitrous acid) are substantially less effective in this regard, the increase in cetane number being only 3.2 to 4.8 units when similar amounts were used in the fuel.

As contemplated herein, the halogen- and nitrogen-containing reaction products of this invention may be used in amounts varying from about 0.1 per cent to about 5.0 per cent. It is to be understood that the term "Diesel fuel" as used herein refers broadly to any liquid hydrocarbon adapted for use in any compression ignition engine.

We claim:

1. An improved Diesel fuel comprising a nonviscous hydrocarbon oil and in admixture therewith a minor proportion, sufficient to improve the ignition quality of the fuel, of a halogen- and nitrogen-containing reaction product predominantly comprised of a compound selected from the group of compounds consisting of halogen-substituted nitrolic acids and halogen-substituted pseudonitroles represented respectively by the general formulae

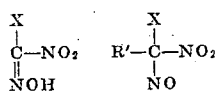

where X is a halogen atom and R' is a hydrocarbon radical, said reaction product having been obtained by reaction of nitrous acid and a halogen-substituted nitroparaffin represented by the general formula

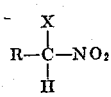

wherein X is a halogen atom and R is selected from the group consisting of a hydrogen atom and a hydrocarbon radical.

2. An improved Diesel fuel comprising a nonviscous hydrocarbon oil and in admixture therewith a minor proportion, from about 0.1 per cent to about 5.0 per cent, of a halogen- and nitrogen-containing reaction product predominantly comprised of a compound selected from the group of compounds consisting of halogen-substituted nitrolic acids and halogen-substituted pseudonitroles represented respectively by the general formulae

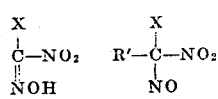

wherein X is a halogen atom and R' is a hydrocarbon radical, said reaction product having been obtained by reaction of nitrous acid and a halogen-substituted nitroparaffin represented by the general formula

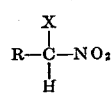

wherein X is a halogen atom and R is selected from the group consisting of a hydrogen atom and a hydrocarbon radical.

3. An improved Diesel fuel comprising a nonviscous hydrocarbon oil and in admixture therewith a minor proportion, sufficient to improve the ignition quality of the fuel, of a halogen- and nitrogen-containing reaction product predominantly comprised of a compound selected from the group of compounds consisting of halogen-substituted nitrolic acids and halogen-substituted pseudonitroles represented respectively by the general formulae

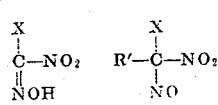

wherein X is a halogen atom and R' is a hydrocarbon radical, said reaction product having been obtained by reaction, at a temperature below about 15° C., of an alkali metal hydroxide, a mineral acid other than nitrous acid, and a halogen-substituted nitroparaffin represented by the general formula

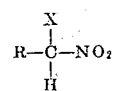

wherein X is a halogen atom and R is selected from the group consisting of a hydrogen atom and a hydrocarbon radical.

4. An improved Diesel fuel comprising a nonviscous hydrocarbon oil and in admixture therewith a minor proportion, sufficient to improve the ignition quality of the fuel, of a halogen- and nitrogen-containing reaction product predominantly comprised of a compound selected from the group of compounds consisting of halogen-substituted nitrolic acids and halogen-substituted pseudonitroles represented respectively by the general formulae

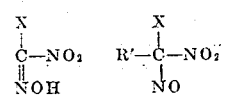

wherein X is a halogen atom and R' is a hydrocarbon radical, said reaction product having been obtained by the following procedure: reacting a halogen-substituted nitroparaffin represented by the general formula

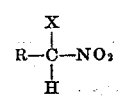

wherein X is a halogen atom and R is selected from the group consisting of a hydrogen atom and a hydrocarbon radical, with an alkali metal hydroxide; treating the reaction mixture formed in the preceding operation with a mineral acid other than nitrous acid at a temperature below about 15° C.; and separating said reaction product from the reaction mixture formed in the last-mentioned operation.

5. An improved Diesel fuel comprising a nonviscous hydrocarbon oil and in admixture therewith a minor proportion, sufficient to improve the ignition quality of the fuel, of a halogen- and nitrogen-containing reaction product predominantly comprised of a compound selected from the group of compounds consisting of halogen-substituted nitrolic acids and halogen-substituted pseudonitroles represented respectively by the general formulae

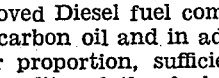

wherein X is a halogen atom and R' is a hydrocarbon radical, said reaction product having been obtained by reaction, at a temperature below about 15° C. of an alkali metal hydroxide, an alkali nitrite, a mineral acid and a halogen-substituted nitroparaffin represented by the general formula

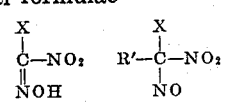

wherein X is a halogen atom and R is selected from the group consisting of a hydrogen atom and a hydrocarbon radical.

6. An improved Diesel fuel comprising a nonviscous hydrocarbon oil and in admixture therewith a minor proportion, sufficient to improve the ignition quality of the fuel, of a halogen- and nitrogen-containing reaction product predominantly comprised of a compound selected from the group of compounds consisting of halogen-substituted nitrolic acids and halogen-substituted pseudonitroles represented respectively by the general formulae

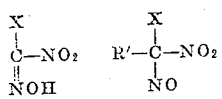

wherein X is a halogen atom and R' is a hydrocarbon radical, said reaction product having been obtained by the following procedure: reacting a halogen-substituted nitroparaffin represented by the general formula

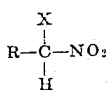

wherein X is a halogen atom and R is selected from the group consisting of a hydrogen atom and a hydrocarbon radical, with an alkali metal hydroxide; reacting an alkali nitrite with the reaction mixture formed in the preceding operation at a temperature below about 15° C.; immediately treating the reaction mixture formed in the last-mentioned operation with a mineral acid at a temperature below about 15° C.; and separating said reaction product from the reaction mixture formed with said mineral acid.

7. An improved Diesel fuel comprising a non-viscous hydrocarbon oil and in admixture therewith a minor proportion, sufficient to improve the ignition quality of the fuel, of a chlorine- and nitrogen-containing reaction product predominantly comprised of a compound selected from the group of compounds consisting of chlorine-substituted methylnitrolic acid and chlorine-substituted pseudonitroles represented respectively by the general formulae

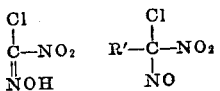

wherein R' is a hydrocarbon radical, said reaction product having been obtained by reaction of nitrous acid and a chlorine-substituted nitroparaffin represented by the general formula

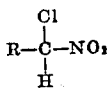

wherein R is selected from the group consisting of a hydrogen atom and a hydrocarbon radical.

8. An improved Diesel fuel comprising a non-viscous hydrocarbon oil and in admixture therewith a minor proportion, sufficient to improve the ignition quality of the fuel, of a chlorine- and nitrogen-containing reaction product predominantly comprised of a compound selected from the group of compounds consisting of chlorine-substituted methylnitrolic acid and chlorine-substituted pseudonitroles represented respectively by the general formulae

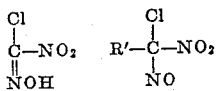

wherein R' is a hydrocarbon radical, said reaction product having been obtained by reaction, at a temperature below about 15° C., of an alkali metal hydroxide, a mineral acid other than nitrous acid, and a chlorine-substituted nitroparaffin represented by the general formula

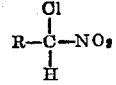

wherein R is selected from the group consisting of a hydrogen atom and a hydrocarbon radical.

9. An improved Diesel fuel comprising a non-viscous hydrocarbon oil and in admixture therewith a minor proportion, sufficient to improve the ignition quality of the fuel, of a chlorine- and nitrogen-containing reaction product predominantly comprised of a compound selected from the group of compounds consisting of chlorine-substituted methylnitrolic acid and chlorine-substituted pseudonitroles represented respectively by the general formulae

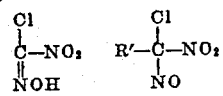

wherein R' is a hydrocarbon radical, said reaction product having been obtained by the following procedure: reacting a chlorine-substituted nitroparaffin represented by the general formula

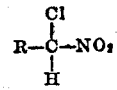

wherein R is selected from the group consisting of a hydrogen atom and a hydrocarbon radical, with an alkali metal hydroxide; treating the reaction mixture formed in the preceding operation with a mineral acid other than nitrous acid at a temperature below about 15° C.; and separating said reaction product from the reaction mixture formed in the last-mentioned operation.

10. An improved Diesel fuel comprising a non-viscous hydrocarbon oil and in admixture therewith a minor proportion, sufficient to improve the ignition quality of the fuel, of a chlorine- and nitrogen-containing reaction product predominantly comprised of a compound selected from the group of compounds consisting of chlorine-substituted methylnitrolic acid and chlorine-substituted pseudonitroles represented respectively by the general formulae

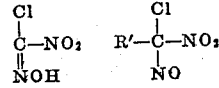

wherein R' is a hydrocarbon radical, said reaction product having been obtained by reaction, at a temperature below about 15° C., of an alkali metal hydroxide, an alkali nitrite, a mineral acid and a chlorine-substituted nitroparaffin represented by the general formula

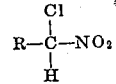

wherein R is selected from the group consisting of a hydrogen atom and a hydrocarbon radical.

11. An improved Diesel fuel comprising a non-viscous hydrocarbon oil and in admixture therewith a minor proportion, sufficient to improve the ignition quality of the fuel, of a chlorine- and nitrogen-containing reaction product predominantly comprised of a compound selected from the group of compounds consisting of chlorine-substituted methylnitrolic acid and chlorine-substituted pseudonitroles represented respectively by the general formulae

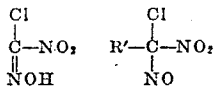

wherein R' is a hydrocarbon radical, said reaction product having been obtained by the following procedure: reacting a chlorine-substituted nitroparaffin represented by the general formula

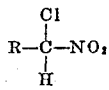

wherein R is selected from the group consisting of a hydrogen atom and a hydrocarbon radical, with an alkali metal hydroxide; reacting an alkali nitrite with the reaction mixture formed in the preceding operation at a temperature below about 15° C.; immediately treating the reaction mixture formed in the last-mentioned operation with a mineral acid at a temperature below about 15° C.; and separating said reaction product from the reaction mixture formed with said mineral acid.

12. An improved Diesel fuel comprising a non-viscous hydrocarbon oil and in admixture therewith a minor proportion, sufficient to improve the ignition quality of the fuel, of chloromethyl-nitrolic acid represented by the formula

13. An improved Diesel fuel comprising a non-viscous hydrocarbon oil and in admixture therewith a minor proportion, sufficient to improve the ignition quality of the fuel, of 1-chloro-ethyl-pseudonitrole represented by the formula

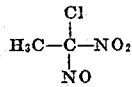

14. An improved Diesel fuel comprising a non-viscous hydrocarbon oil and in admixture therewith a minor proportion, sufficient to improve the ignition quality of the fuel, of 1-chloro-propyl-pseudonitrole represented by the formula

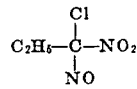

15. The method of accelerating the ignition of a liquid hydrocarbon fuel in an engine where the fuel is injected into compressed air in the engine cylinder and ignites spontaneously therein, which comprises admixing with the fuel, prior to its injection into the cylinder, a minor proportion, of a halogen- and nitrogen-containing reaction product predominantly comprised of a compound selected from the group of compounds consisting of halogen-substituted nitrolic acids and halogen-substituted pseudonitroles represented respectively by the general formulae

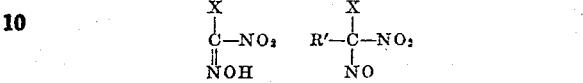

wherein X is a halogen atom and R' is a hydrocarbon radical, said reaction product having been obtained by reaction of nitrous acid and a halogen-substituted nitroparaffin represented by the general formula

wherein X is a halogen atom and R is selected from the group consisting of a hydrogen atom and a hydrocarbon radical.

16. The method of accelerating the ignition of a liquid hydrocarbon fuel in an engine where the fuel is injected into compressed air in the engine cylinder and ignites spontaneously therein, which comprises admixing with the fuel, prior to its injection into the cylinder, a minor proportion, from about 0.1 per cent to about 5.0 per cent, of a halogen- and nitrogen-containing reaction product predominantly comprised of a compound selected from the group of compounds consisting of halogen-substituted nitrolic acids and halogen-substituted pseudonitroles represented respectively by the general formulae

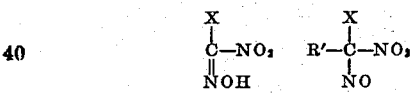

wherein X is a halogen atom and R' is a hydrocarbon radical, said reaction product having been obtained by reaction of nitrous acid and a halogen-substituted nitroparaffin represented by the general formula

wherein X is a halogen atom and R is selected from the group consisting of a hydrogen atom and a hydrocarbon radical.

THOMAS T. NOLAND.
EDWIN M. NYGAARD.